United States Patent
Laurent et al.

(10) Patent No.: US 10,295,972 B2
(45) Date of Patent: May 21, 2019

(54) SYSTEMS AND METHODS TO OPERATE CONTROLLABLE DEVICES WITH GESTURES AND/OR NOISES

(71) Applicant: Brain Corporation, San Diego, CA (US)

(72) Inventors: Patryk Laurent, San Diego, CA (US); Eugene Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 203 days.

(21) Appl. No.: 15/143,397

(22) Filed: Apr. 29, 2016

(65) Prior Publication Data

US 2017/0315519 A1   Nov. 2, 2017

(51) Int. Cl.
| | |
|---|---|
| *G06F 3/01* | (2006.01) |
| *G06F 3/03* | (2006.01) |
| *H04W 8/00* | (2009.01) |
| *G05B 15/02* | (2006.01) |
| *G06F 3/038* | (2013.01) |
| *H04L 12/28* | (2006.01) |

(Continued)

(52) U.S. Cl.
CPC ............ G05B 15/02 (2013.01); G06F 3/011 (2013.01); G06F 3/017 (2013.01); G06F 3/0304 (2013.01); G06F 3/038 (2013.01); H04L 12/282 (2013.01); H04L 12/2809 (2013.01); H04M 1/72533 (2013.01); H04W 4/021 (2013.01); H04M 1/7253 (2013.01); H04W 8/005 (2013.01)

(58) Field of Classification Search
CPC ....... G05B 15/02; G06F 3/017; H04L 12/282; H04W 8/005; H04W 4/021

USPC ...................................................... 700/275
See application file for complete search history.

(56) References Cited

U.S. PATENT DOCUMENTS

| | | | |
|---|---|---|---|
| 5,046,022 A | 9/1991 | Conway et al. | |
| 5,063,603 A | 11/1991 | Burt | |

(Continued)

FOREIGN PATENT DOCUMENTS

| | | |
|---|---|---|
| CN | 102226740 A | 10/2011 |
| JP | H0487423 A | 3/1992 |

(Continued)

OTHER PUBLICATIONS

Abbott L. F. and Nelson S.B. (2000), "Synaptic plasticity: taming the beast", Nature Neuroscience, 3, 1178-1183.

(Continued)

*Primary Examiner* — Ziaul Karim
(74) *Attorney, Agent, or Firm* — Reed Smith LLP; Sidharth Kapoor

(57) ABSTRACT

Gesture recognition systems that are configured to provide users with simplified operation of various controllable devices such as, for example, in-home controllable devices. In one implementation, the gesture recognition system automatically configures itself in order to determine the respective physical locations and/or identities of controllable devices as well as an operating mode for controlling the controllable devices through predetermined gesturing. In some implementations, the gesture recognition systems are also configured to assign boundary areas associated with the controllable devices. Apparatus and methods associated with the gesture recognition systems are also disclosed.

13 Claims, 7 Drawing Sheets

(51) Int. Cl.
*H04M 1/725* (2006.01)
*H04W 4/021* (2018.01)

(56) References Cited

U.S. PATENT DOCUMENTS

| | | |
|---|---|---|
| 5,079,491 A | 1/1992 | Nose et al. |
| 5,092,343 A | 3/1992 | Spitzer et al. |
| 5,245,672 A | 9/1993 | Wilson et al. |
| 5,355,435 A | 10/1994 | Deyong et al. |
| 5,388,186 A | 2/1995 | Bose |
| 5,408,588 A | 4/1995 | Ulug |
| 5,467,428 A | 11/1995 | Ulug |
| 5,638,359 A | 6/1997 | Peltola et al. |
| 5,673,367 A | 9/1997 | Buckley |
| 5,875,108 A | 2/1999 | Hoffberg et al. |
| 5,937,143 A | 8/1999 | Watanabe et al. |
| 6,009,418 A | 12/1999 | Cooper |
| 6,014,653 A | 1/2000 | Thaler |
| 6,363,369 B1 | 3/2002 | Liaw et al. |
| 6,458,157 B1 | 10/2002 | Suaning |
| 6,545,705 B1 | 4/2003 | Sigel et al. |
| 6,545,708 B1 | 4/2003 | Tamayama et al. |
| 6,546,291 B2 | 4/2003 | Merfeld et al. |
| 6,581,046 B1 | 6/2003 | Ahissar |
| 6,643,627 B2 | 11/2003 | Liaw et al. |
| 7,164,971 B2 | 1/2007 | Ferla et al. |
| 7,395,251 B2 | 7/2008 | Linsker |
| 7,426,920 B1 | 9/2008 | Petersen |
| 7,672,920 B2 | 3/2010 | Ito et al. |
| 7,849,030 B2 | 12/2010 | Ellingsworth |
| 7,937,164 B2 | 5/2011 | Samardzija et al. |
| 7,945,349 B2 | 5/2011 | Svensson et al. |
| 7,970,492 B2 | 6/2011 | Matsushima et al. |
| 8,015,130 B2 | 9/2011 | Matsugu et al. |
| 8,315,305 B2 | 11/2012 | Petre et al. |
| 8,467,623 B2 | 6/2013 | Izhikevich et al. |
| 8,494,677 B2 | 7/2013 | Mizutani |
| 8,600,166 B2 | 12/2013 | Adhikari |
| 2002/0038294 A1 | 3/2002 | Matsugu |
| 2003/0050903 A1 | 3/2003 | Liaw et al. |
| 2004/0056625 A1 | 3/2004 | Sano et al. |
| 2004/0102862 A1 | 5/2004 | Kato et al. |
| 2004/0136439 A1 | 7/2004 | Dewberry et al. |
| 2004/0153211 A1 | 8/2004 | Kamoto et al. |
| 2004/0193670 A1 | 9/2004 | Langan et al. |
| 2004/0225416 A1 | 11/2004 | Kubota et al. |
| 2005/0015351 A1 | 1/2005 | Nugent |
| 2005/0036649 A1 | 2/2005 | Yokono et al. |
| 2005/0149227 A1 | 7/2005 | Peters et al. |
| 2005/0283450 A1 | 12/2005 | Matsugu et al. |
| 2006/0094001 A1 | 5/2006 | Torre et al. |
| 2006/0145647 A1 | 7/2006 | Kitatsuji et al. |
| 2006/0161218 A1 | 7/2006 | Danilov |
| 2007/0022068 A1 | 1/2007 | Linsker |
| 2007/0053513 A1* | 3/2007 | Hoffberg ............ G06K 9/00369 380/201 |
| 2007/0176643 A1 | 8/2007 | Nugent |
| 2007/0208678 A1 | 9/2007 | Matsugu |
| 2007/0276690 A1 | 11/2007 | Ohtani et al. |
| 2008/0100482 A1 | 5/2008 | Lazar |
| 2009/0043722 A1 | 2/2009 | Nugent |
| 2009/0287624 A1 | 11/2009 | Rouat et al. |
| 2010/0036457 A1 | 2/2010 | Sarpeshkar et al. |
| 2010/0081375 A1* | 4/2010 | Rosenblatt ............ G08C 17/02 455/41.1 |
| 2010/0081958 A1 | 4/2010 | She |
| 2010/0086171 A1 | 4/2010 | Lapstun |
| 2010/0119214 A1 | 5/2010 | Shimazaki et al. |
| 2010/0166320 A1 | 7/2010 | Paquier |
| 2010/0182136 A1* | 7/2010 | Pryor ............ G01F 23/292 340/425.5 |
| 2010/0225824 A1 | 9/2010 | Lazar et al. |
| 2010/0289643 A1* | 11/2010 | Trundle ............ G08C 19/16 340/545.1 |
| 2011/0016071 A1 | 1/2011 | Guillen et al. |
| 2011/0119214 A1 | 5/2011 | Breitwisch et al. |
| 2011/0119215 A1 | 5/2011 | Elmegreen et al. |
| 2011/0208355 A1 | 8/2011 | Tsusaka |
| 2012/0011090 A1 | 1/2012 | Tang et al. |
| 2012/0079866 A1 | 4/2012 | Kuwayama et al. |
| 2012/0109866 A1 | 5/2012 | Modha |
| 2012/0209428 A1 | 8/2012 | Mizutani |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0201316 A1* | 8/2013 | Binder ............ H04L 67/12 348/77 |
| 2013/0218821 A1 | 8/2013 | Szatmary et al. |
| 2013/0251278 A1 | 9/2013 | Izhikevich et al. |
| 2013/0272570 A1 | 10/2013 | Sheng et al. |
| 2013/0297542 A1 | 11/2013 | Piekniewski et al. |
| 2013/0310977 A1 | 11/2013 | Tsusaka et al. |
| 2013/0318217 A1* | 11/2013 | Imes ............ G05B 15/02 709/221 |
| 2013/0325768 A1 | 12/2013 | Sinyavskiy et al. |
| 2013/0325773 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2014/0012788 A1 | 1/2014 | Piekniewski |
| 2014/0079297 A1 | 3/2014 | Tadayon et al. |
| 2014/0081895 A1 | 3/2014 | Coenen et al. |
| 2014/0114477 A1 | 4/2014 | Sato et al. |
| 2014/0142729 A1* | 5/2014 | Lobb ............ G06F 3/011 700/90 |
| 2015/0149929 A1* | 5/2015 | Shepherd ............ H04L 65/403 715/753 |
| 2016/0075015 A1 | 3/2016 | Izhikevich et al. |

FOREIGN PATENT DOCUMENTS

| | | |
|---|---|---|
| RU | 2108612 C1 | 4/1998 |
| WO | WO-2008083335 A2 | 7/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the interne <a href="http://homepages.cwi.nl/~sbohte/publication/phdthesis.pdr">http://homepages.cwi.nl/~sbohte/publication/phdthesis.pdf<url: />.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), dated Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

(56) References Cited

OTHER PUBLICATIONS

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Floreano et al., 'Neuroevolution: from architectures to learning' Evol. Intel. Jan. 2008 1:47-62, [retrieved Dec. 30, 2013] retrieved online from URL:http://inforscienee.eptl.cb/record/112676/files/FloreanoDuerrMattiussi2008.pdf<http: />.

Gewaltig et al.. 'NEST (Neural Simulation Tool)', Scholarpedia, 2007. pp. 1-15. 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.

Harmony Ultimate User Guide, Version 4, pp. 1-54 Oct. 31, 2013.

Izhikevich E.M. (2006) Polychronization: Computation With Spikes. Neural Computation, 18:245-282.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Jin, X., Rast, A., F. Galluppi, F., S. Davies., S., and Furber, S. (2010) "Implementing Spike-Timing-Dependent Plasticity on SpiNNaker Neuromorphic Hardware", WCCI 2010, IEEE World Congress on Computational Intelligence.

Karbowski et al., 'Multispikes and Synchronization in a Large Neural Network with Temporal Delays', Neural Computation 12. 1573-1606 (2000).

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL:http://www-ee.uta.edu/eeweb/IP/Courses/SPR/Reference/ Khotanzad.pdf.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.

Laurent, 'The Neural Network Query Language (NNQL) Reference' [retrieved on Nov. 12, 2013]. Retrieved from the Internet: <URL'https://code.google.com/p/ nnql/issues/detail?id=1>.

Lazar et a]. 'Multichannel time encoding with integrate-and-fire neurons.' Neurocomputing 65 (2005): 401-407.

Lazar et al. 'A video time encoding machine', in Proceedings of the 15th IEEE International Conference on Image Processing (ICIP '08 2008, pp. 717-720.

Lazar et al. 'Consistent recovery of sensory stimuli encoded with MIMO neural circuits.' Computational intelligence and neuroscience (2010): 2.

Masquelier, Timothee, 'Relative spike time coding and STOP-based orientation selectivity in the early visual system in natural continuous and saccadic vision: a computational model.' Journal of computational neuroscience 32.3 (2012): 425-441.

Nichols, A Reconfigurable Computing Architecture for Implementing Artificial Neural Networks on FPGA, Master's Thesis, The University of Guelph, 2003, pp. 1-235.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu!viewdoc/download?doi= 0.1.1.5.4346&rep—repl&type-pdf.

Sato et al., 'Pulse interval and width modulation for video transmission.' Cable Television, IEEE Transactions on 4 (1978): 165-173.

Schemmel, J., et al., Implementing synaptic plasticity in a VLSI spiking neural network model. In: Proceedings of the 2006 International Joint Conference on Neural Networks (IJCNN'06), IEEE Press (2006) Jul. 16-21, 2006, pp. 1-6 [online], [retrieved on Aug. 24, 2012]. Retrieved from the Internet <url: Introduction</url>.

Simulink.RTM. model [online], [Retrieved on Dec. 10, 2013] Retrieved from <URL: http://www.mathworks.com/ products/simulink/index.html>.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary., et al "Spike-timing Theory of Working Memory" PLoS Computational Biology, vol. 6, Issue 8, Aug. 19, 2010 [retrieved on Dec. 30, 2013]. Retrieved from the Internet: URL:http://www.ploscompbioLorg/article/info%3Adoi% 2F10.1371 %2Fjournal,pcbi.1000879<url:></url:>.

Wang 'The time dimension for scene analysis.' Neural Networks, IEEE Transactions on 16.6 (2005): 1401-1426.

* cited by examiner

SYSTEMS AND METHODS TO OPERATE CONTROLLABLE DEVICES WITH GESTURES AND/OR NOISES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to, inter alia, gesture detection systems and methods of utilizing the same. Specifically, in one aspect, the present disclosure relates to gesture detection systems and methods useful for operation of controllable devices.

Background

Simplified operation of controllable devices (e.g., lights, televisions, stereos, etc.) has become desirable for users. For example, lamps that have conductive surfaces that turn the lamp either on or off upon being touched by a user have become increasingly popular. However, this technology may only work for these specific devices and often it isn't immediately apparent to a user whether or not these specific devices operate as intended. Additionally, many home appliances often include a power switch that is located in an inconvenient location such as, for example, on a cord that goes behind other furniture, or behind/underneath the device to be controlled. These inconveniences become further pronounced for users who are partially immobilized, or have other disabilities that affect their mobility, dexterity, and/or eye sight.

Other conventional mechanisms for simplifying operation of controllable devices include use of, for example, remote control devices. In some cases, a device-specific remote control is used for each controllable device and hence, for users that have multiple devices to control, the user will often have to keep track of multiple remote controls. Additionally, often times these device-specific remote controls are not intuitive to use, thereby demanding a user to manipulate a series of buttons on the remote control in order to operate these devices. Other known solutions include use of personal computing devices (e.g., laptops, smart phones, tablets, etc.) that often have software applications that utilize user-assisted programming in order to enable a user to operate these controllable devices. Such applications may be complicated and/or time-consuming to set up for operation, and additionally are often bulky, thereby requiring a user to carry around the computing device. Further, in some examples, the user may need to "teach" the software application how to operate the controllable device(s).

SUMMARY

The foregoing needs are satisfied by the present disclosure, which provides for inter alia, apparatus and methods for the simplified operation and control of various appliances such as, for example, lamps, home multimedia equipment, etc.

In a first aspect, a non-transitory computer-readable storage medium is disclosed. In some implementations, the non-transitory computer-readable storage medium includes a plurality of instructions, the instructions being executable by a processing apparatus to operate a gesture detection system, the processor being in signal communication with one or more detection devices, the instructions configured to, when executed by the processing apparatus, cause the processing apparatus to: emit one or more signals from the detection system; discover a location of each of one or more controllable devices within a detectable area based at least in part on a response of each of the one or more controllable devices to the emitted signals; and detect via the one or more detection devices a predetermined gesture, wherein the detection of the predetermined gesture commands at least in part a change in a user-controlled operational state of the one or more controllable devices.

In some implementations, the instructions when executed by the processing apparatus further cause the processing apparatus to: assign a boundary area to each of the one or more controllable devices after discovery of the location.

In some implementations, the detection of the predetermined gesture further includes detection of the predetermined gesture within the assigned boundary area.

In some implementations, the one or more controllable devices includes a first wirelessly controllable device having a first unique identifier, and assignment of the boundary area to each of the one or more controllable devices further includes association of a first boundary area with the first unique identifier.

In some implementations, the predetermined gesture is at least one of a gesture directed towards the one or more controllable devices, a gesture in proximity to the one or more controllable devices, and a gesture interacting with the one or more controllable devices.

In some implementations, the one or more controllable devices includes a second wirelessly controllable device, the second wirelessly controllable device having a second unique identifier; and assignment of the boundary area to each of the one or more controllable devices further includes association of a second boundary area with the second unique identifier.

In some implementations, discovery of the location of each of the one or more controllable devices further includes wireless detection within a wireless network of the first unique identifier and the second unique identifier.

In some implementations, detection of the predetermined gesture further includes detection of a first gesture within the first boundary area for user-controlled operation of the first wirelessly controllable device and detection of a second predetermined gesture within the second boundary area for user-controlled operation of the second wirelessly controllable device.

In some implementations, in response to the first predetermined gesture, the user-controlled operational state of the second wirelessly controllable device is substantially maintained, and in response to the second predetermined gesture, the user-controlled operational state of the first wirelessly controllable device is substantially maintained.

In some implementations, the predetermined gesture includes a motion performed by at least one of a person, animal, and object.

In some implementations, the one or more detection devices includes a camera and the response includes a visual change detectable by the camera.

In some implementations, the one or more detection devices includes a microphone and the response includes an auditory change detectable by the microphone.

In some implementations, the instructions when executed by the processing apparatus, further cause the processing apparatus to detect via the one or more detection devices a noise created by a user to command at least in part the change in the user-controlled operational state of the one or more controllable devices.

In some implementations, the instructions when executed by the processing apparatus, further cause the processing apparatus to learn a demonstrated gesture as the predetermined gesture and associate at least in part the detection of the demonstrated gesture to the change in the user-controlled operational state of the one or more controllable devices.

In a second aspect, a method of operating a gesture detection system having a detection device in signal communication with a processor is disclosed. In one implementation, the method includes emitting one or more signals from the gesture detection system; discovering a location of at least one controllable device within a detectable area based at least in part on a response of the at least one controllable device to the emitted signals; detecting at least one predetermined gesture performed by a user to command operation of the at least one controllable device; and sending a signal to the at least one controllable device that is configured to regulate operation of the at least one controllable device.

In some implementations, the act of discovering the location of the at least one controllable device within the detectable area includes automatically operating the at least one controllable device and detecting a measurable change associated with the operation of the at least one controllable device.

In some implementations, the method further includes assigning a boundary area to the at least one controllable device and the act of detecting the at least one predetermined gesture includes detecting at least one predetermined gesture being performed within the boundary area.

In some implementations, the act of discovering the location of the at least one controllable device further includes detecting within a local area network a unique identifier associated with the at least one controllable device; and the act of assigning the boundary area to the at least one controllable device further includes associating the unique identifier with the boundary area.

In a third aspect, a system configured to detect gestures for operation of one or more controllable devices within a detectable area is disclosed. In one implementation, the system includes a detection device; a processing apparatus in communication with the detection device; and a non-transitory computer readable storage medium having a plurality of instructions stored thereon, the instructions when executed by the processing apparatus, cause the processing apparatus to: operate a controllable device so as to cause the controllable device to generate a measurable change in state; detect the measurable change in state of the controllable device; discover a location of the controllable device based on the detection of the measurable change; assign a boundary area to the controllable device based on the discovered location; detect a predetermined gesture performed by a user within the assigned boundary area; and in response to the detection of the predetermined gesture, send a signal to the controllable device to cause the controllable device to operate in accordance with the predetermined gesture.

In some implementations, the non-transitory computer readable storage medium can have instructions thereon that when executed by the processing apparatus, cause the processing apparatus to place the location of the controllable device within a predefined map.

In a fourth aspect of the disclosure, a controllable device for use with a detection apparatus is disclosed.

In a fifth aspect of the disclosure, methods of operating the aforementioned controllable device are disclosed.

In a sixth aspect of the disclosure, detection apparatus for use with a detection apparatus is disclosed.

In a seventh aspect of the disclosure, methods of operating the aforementioned detection apparatus are disclosed.

In an eighth aspect of the disclosure, a computing device for use with a detection apparatus is disclosed.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
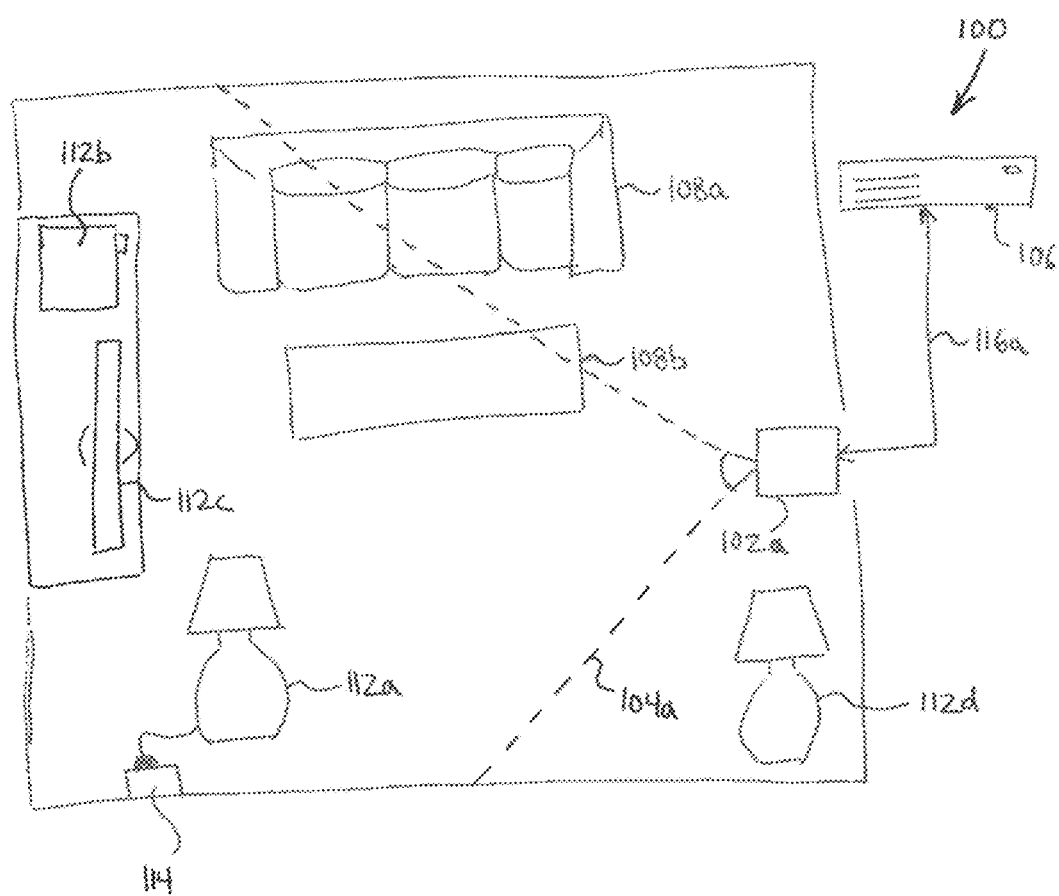
FIG. 1 is a plan view of an example gesture recognition system incorporated into a user premises in accordance with one implementation of the present disclosure.

All Figures disclosed herein are © Copyright 2015-2016 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of, or combination with, some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same components, and vice-versa, unless explicitly stated otherwise herein. Further, the present disclosure encompasses present and future known equivalents to the components referred to herein by way of illustration.

As used herein, the terms computer, and computing device can include, but are not limited to, personal computers (PCs) and minicomputers, whether desktop, laptop, or otherwise, mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication or entertainment devices, and/or any device capable of executing a set of instructions and processing an incoming data signal.

As used herein, the terms computer program or software can include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoxML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms connection, link, transmission channel, delay line, wireless can include a causal link between any two or more entities (whether physical or logical/virtual), which enables information exchange between the entities.

As used herein, the term memory can include any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms processor, microprocessor and digital processor include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term network interface can include any signal, data, or software interface with a component, network, or process including, without limitation, those of the FireWire (e.g., FW400, FW800, FWS800T, FWS1600, FWS3200, etc.), USB (e.g., USB 1.X, USB 2.0, USB 3.0, USB Type-C, etc.), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, the term wireless can include any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, any radio transmission, any radio frequency field, and infrared (e.g., IrDA).

As used herein, the term wired can include any signal transferred over a wire, including any wire with a signal line. For example, and without limitation, such wires with signal lines can include cables such as Ethernet cables, coaxial cables, Universal Serial Bus (USB), firewire, data lines, wire, and/or any wired connection known in the art.

Any of the various descriptions in this disclosure (e.g., examples, implementations, implementations, systems, methods, etc.) can be instantiated in hardware and/or software. For example, and without limitation, functionality and structure described in this disclosure can represent physical hardware that is hardcoded to perform such functionality. As another example, software can be run that performs such functionality and/or has such structure.

Overview

The present disclosure provides for gesture recognition systems that are configured to provide users with simplified operation of various controllable devices such as, for example, in-home controllable devices (e.g., lights, televisions, stereos, electrically operated fireplaces, electrically operated tea kettles, etc.). The gesture recognition systems disclosed herein may also automatically configure themselves through a so-called auto-configuration mode in order to determine the respective physical locations and/or identities of controllable devices. As a result of this auto-configuration mode, this functionality is available "out of the box" without requiring the user to perform complicated setup protocols, or otherwise requiring extensive supervised training of their devices. Moreover, each controllable device within the detectable area of an imaging device can be readily tracked, even when controllable devices within a detectable area are subsequently moved. In implementations described subsequently herein, a gesture recognition system is configured to: (i) automatically discover locations associated with one or more controllable devices within a detectable area, (ii) assign a boundary area to each of the discovered controllable devices, (iii) detect a predetermined gesture performed by a user to command operation of one of the controllable devices, and (iv) send a signal to operate the controllable device corresponding to the boundary area (e.g., an area proximal to and/or at the controllable device) within which the detected gesture was performed. The disclosed systems and methods may be configured for one or more additional functions such as, for example, unsupervised learning, calculation of local coordinate maps, overlay of boundary areas onto a camera view, etc.

A system having such functionality: (i) reduces the need for device-specific remote control devices; (ii) enables intuitive operative commands for these controllable devices; (iii) discovers the locations/identities of controllable devices automatically; and (iv) generates multiple commands for simultaneous control of multiple controllable aspects of a given controllable device (e.g., for control of channel, volume, etc. for a television) as well as for operation of multiple controllable devices contemporaneously with one another. Methods of utilizing the aforementioned detection systems are also disclosed. Other advantages are readily discernable by one of ordinary skill given the contents of the present disclosure.

Detailed Description of Exemplary Implementations

Detailed descriptions of the various implementations and variants of the apparatus and methods of the disclosure are now provided. While primarily discussed in the context of residential applications, it will be appreciated that the described systems and methods contained herein can be used in other environments including, for example, industrial implementations for controlling operation of industrial equipment, office implementations for controlling operation of office equipment, etc. Myriad other exemplary implementations or uses for the technology described herein would be readily envisaged by persons having ordinary skill in the art, given the contents of the present disclosure.

Gesture Recognition Apparatus—

Turning now to FIG. 1, a block diagram of an exemplary gesture recognition system 100 incorporated into a user premises is shown. As depicted in FIG. 1, system 100 includes a detection device 102a that is able to detect motion and/or light within its field of view (e.g., a detectable area 104a). The detection device 102a may include, for example, an imaging device such as a video camera for the detection of visible light. Other implementations of the detection device include additional technological means to increase upon the spectral range and intensity of the images it captures, including in low light conditions (e.g., so-called night vision technology). For example, in some exemplary implementations, the detection device will include an infrared (IR) camera instead of, or in addition to, a visible light camera. In some implementations, the aforementioned detection device implementations can include stereoscopic vision equipment in order to provide, for example, the ability for the detection device to perceive depth.

As illustrated in FIG. 1, the gesture recognition system 100 is disposed in an environment, such as a room in a home, having non-controllable objects 108a and 108b (e.g., a couch and a coffee table, respectively in the illustrated implementation) as well as controllable devices 112a, 112b, 112c, and 112d. Controllable devices 112a-112d include, in the illustrated implementation, a first light, a stereo, a television, and a second light, respectively. It should be recognized by a person having ordinary skill in the art that the illustrated implementation is just an example and any of controllable devices 112a, 112b, 112c, and 112d can be other controllable devices such as, without limitation, appliances (e.g., dishwashers, refrigerators, washing machines, drink machines, etc.), electronics (e.g., telephones, thermostats, televisions, home entertainment systems, video game consoles, projectors, stereos, etc.), fixtures (e.g., lights, hot tubs, etc.), heaters, air conditioners, vending machines, machinery, toys, and/or any other device that can perform actions under control (e.g., remote control, electronic switches, buttons, etc.). In the present illustrated example, controllable devices 112a-112c are within the detectable area 104a of the detection device 102a, while controllable device 112d is located outside of the detectable area 104a of the detection device 102a. Accordingly, in this illustrated example, controllable devices 112a-112c may be operated with the gesture recognition system 100, while controllable device 112d may not, as it is outside of the detectable area 104a for the detection device 102a.

One or more of the controllable devices is placed in signal communication (as opposed to visual communication) with system 100. For example, controllable device 112a (e.g., the first light) can be placed into signal communication with a wireless enabled electrical outlet device 114 such as, for example, a BELKIN® WEMO® switch. Accordingly, operation of the controllable device 112a can be controlled via wireless signals originating from the detection device 102a and/or computing system 106 that are received by the wireless enabled electrical outlet device 114 thereby enabling the application (or withdrawal) of power to the controllable device 112a.

Moreover, controllable devices 112b and 112c (e.g., a stereo and a television in the present exemplary example) are controlled via conventional IR signals originating from the detection device 102a. Consumer IR devices can communicate via the transmission of digitally-coded pulses of IR radiation to control functions such as power, volume, tuning, etc. In some exemplary implementations, detection device 102a is able to self-determine the make and model number of a given controllable device via its extant imaging capability as well as its coupling to, for example, the Internet (e.g., Internet 306, FIG. 3) via, for example, computing system 106. For example, detection device 102a captures an image of controllable device 112c, and subsequently forwards this image to computing system 106 via network interface 116a. Computing system 106 includes a module that is able to recognize the manufacturer of the television (e.g., SAMSUNG®) by virtue of this captured image and is subsequently able to determine the proper IR coding in order to control the functions of this device 112c. Computing system 106 subsequently transmits this IR coding information to the detection device 102a so that the detection device is able to subsequently control the operation of the controllable device 112c.

In some implementations, and upon initialization of system 100 (e.g., upon initial installation of the system 100, periodic updates of the system 100, etc.), the system will scan the wireless network in order to determine the presence of wireless enabled electrical outlet devices. Subsequent to this discovery, or contemporaneously therewith, detection device 102a will "blast" detectable area 104a with various wireless and/or IR signals while simultaneously monitoring the environment within its detectable area 104a. Accordingly, for example, by detecting visual and/or audio changes in response to these "blast" signals, system 100 is able to identify controllable devices (e.g., controllable devices 112a-112c) as well as associate each of these controllable devices to various wireless/IR signals in order to effectuate their control.

Herein lies a salient advantage of the gesture recognition system 100 as described herein, namely the ability to auto-configure (e.g., auto-configuration mode) various control functions for various ones of the controllable devices 112a-112d. Although auto-configuration functionality is exemplary, it is readily appreciated that the makes/models of various ones of the controllable devices may be inputted manually into computing system 106 and/or detection device 102a. Various features of the auto-configuration functionality, as well as user commanded operation, will be discussed in subsequent detail with regards to the discussion of FIG. 4 infra.

Figure 2:
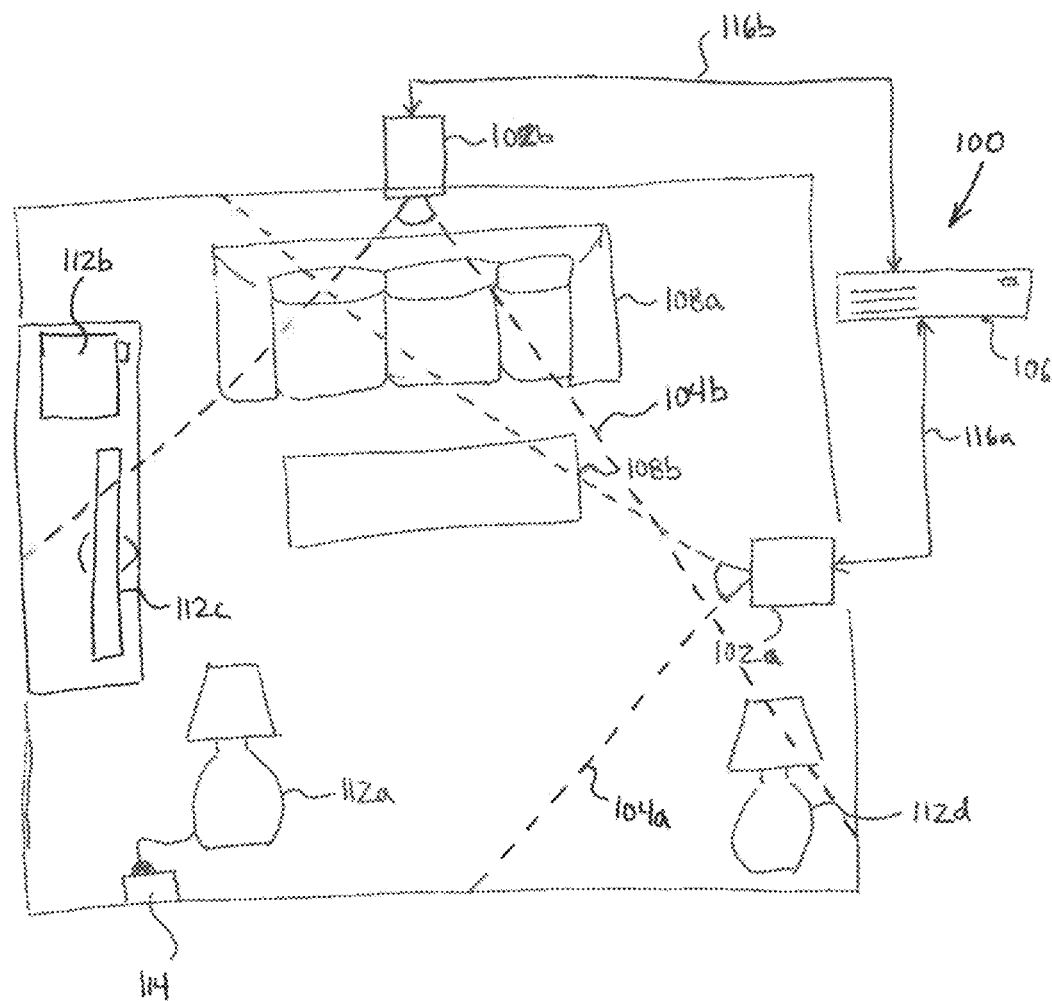
FIG. 2 is a plan view of an example gesture recognition system incorporated into a user premises in accordance with another implementation of the present disclosure.

FIG. 2 illustrates a block diagram of another exemplary gesture recognition system 100 incorporated into a user premises. As depicted in FIG. 2, system 100 includes a first detection device 102a and a second detection device 102b that are configured to detect motion and/or light within their respective fields of view (e.g., detectable areas 104a and 104b). Detection devices 102a and 102b are each in signal and/or data communication with a computing system 106 via network interfaces 116a and 116b, respectively. Similar to the discussion with regards to FIG. 1, system 100 is disposed in an environment, such as a room in a home, having non-controllable objects 108a, 108b (e.g., a couch, coffee table, etc.) and controllable devices 112a, 112b, 112c, and 112d. Controllable devices 112a-112d may be those described herein in reference to system 100. In the present example, controllable devices 112a-112c are within detectable area 104a. Furthermore, controllable devices 112a, 112c and 112d are within detectable area 104b. Thus, in this example of system 100, controllable devices 112a-112d may all be operated with gesture recognition as each of these controllable devices 112a-112d is within the detectable areas associated with the detection devices. System 100 of FIG. 2 is similar to, and may be operated in a similar manner with the system illustrated and discussed with regards to FIG. 1; however, in the case of the system illustrated in FIG. 2, inclusion of a second detection device 102b allows the system to detect additional controllable devices (e.g., controllable device 112d) that might otherwise lie outside of the detectable area.

The disclosed gesture recognition systems (e.g., gesture recognition system 100) may include additional detection devices of the same type (e.g., three cameras, four cameras, etc.) for increasing the coverage scope of detectable areas and/or for including additional detectable areas in other rooms, etc. It will be further appreciated that the disclosed gesture detection systems may include additional detection devices or substitute detection devices of different types, such as the aforementioned night vision cameras and stereoscopic vision cameras. It will be still further appreciated that the detection devices may be placed in a location which optimizes the detectable area depending on locations of the controllable devices within the environment (e.g., a room in a home). For example, and as illustrated in FIG. 2, controllable devices 112a-112c are within the detectable area 104a of detection device 102a, while controllable device 112a, 112c and 112d are within the detectable area 104b of detection device 102b. Accordingly, every controllable device 112a-112d within the illustrated room is within one or more of the detectable areas for the detection devices.

Figure 3:
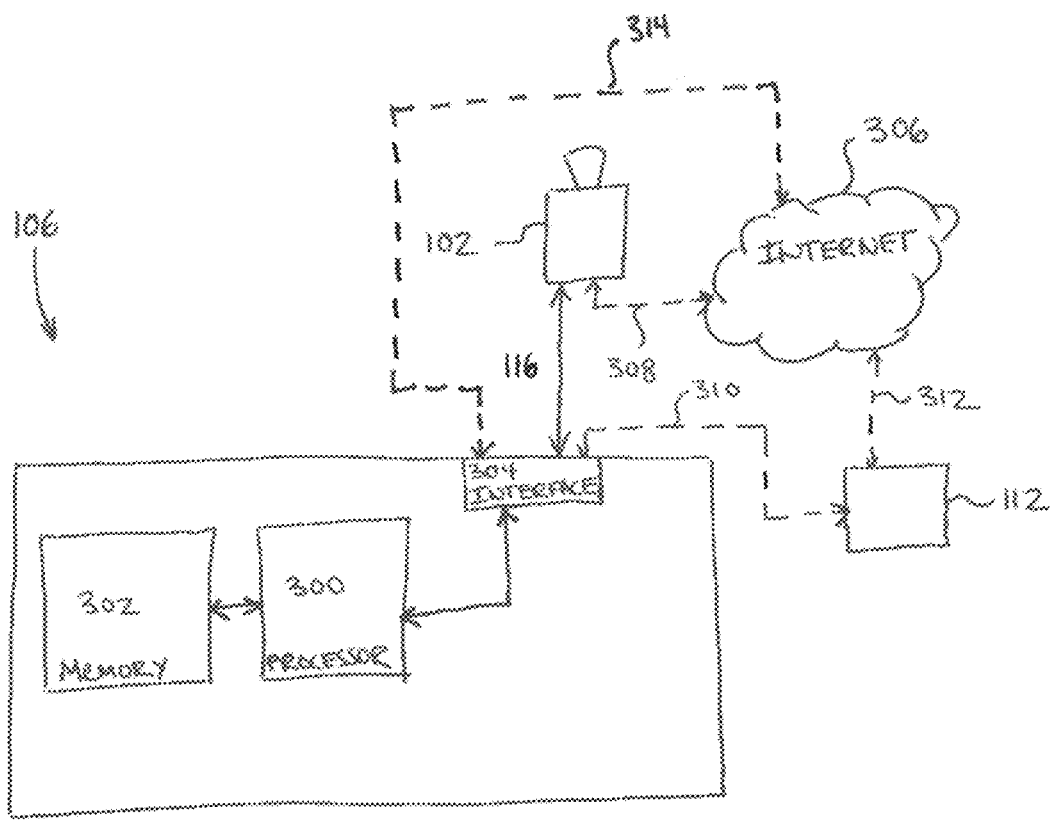
FIG. 3 is a functional block diagram of an example computing device for use with the gesture recognition systems shown in FIGS. 1 and 2.

Referring now to FIG. 3, a block diagram for a computing device 106 is shown and described in detail. Computing device includes, inter alia, one or more processors 300 in data communication with memory 302 as well as network interface(s) 304 for communications external to computing device. For example, as illustrated network interface provides for data communications with the detection device 102 (which can be representative of, e.g., detection device 102a, detection device 102b, or any other detection device) via a wireless or wireline communications link 116. Additionally, network interface 304 optionally provides for communication with the internet 306 via communications link 314, as well as optionally provides for communication with controllable device 112 via communications link 310. Additionally, it is noted that detection device 102 may also have a communications link 308 with the Internet 306, while controllable device 112 may optionally have a communications link 312 with the Internet as well.

The memory 302 of computing device 106 also includes a computer program with computer-readable instructions that when executed by the processor 300 carry out one or more methods operable to implement the gesture recognition systems described herein. Exemplary methods for operating the gesture recognition system are discussed herein, such as in reference to method 400 shown in FIG. 4 discussed infra.

Methods—

Figure 4:
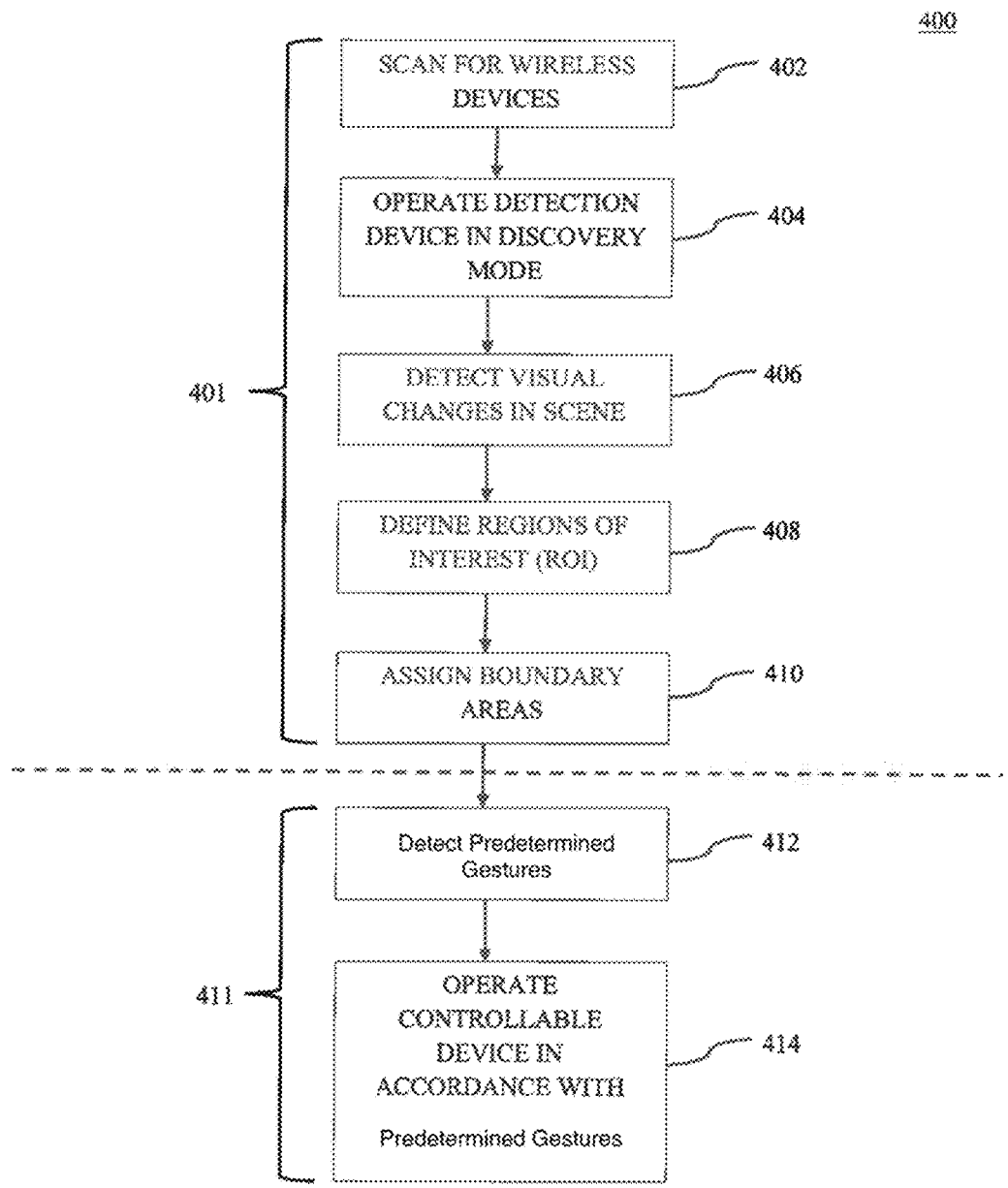
FIG. 4 is a process flow diagram of an exemplary method for auto-configuring and operating the gesture recognition systems shown in FIGS. 1 and 2.

Referring now to FIG. 4, a process flow diagram of an exemplary method 400 for auto-configuring and operating the gesture recognition system 100 shown in, for example, FIGS. 1 and 2. Specifically, as is illustrated in FIG. 4, a first portion 401 of the method 400 includes the discovery and mapping capability portions for the gesture recognition system 100 that will be discussed in subsequent detail herein via steps 402-410 (e.g., so-called "auto-configuration mode"). In one or more implementations, the system 100 performs the first portion 401 of the method 400 upon initial start-up/reboot of the system 100 as well as upon determining that one or more detection devices 102a-102b and/or one or more controllable device 112a-112d has been moved. For example, the system 100 determines that one or more detection devices 102a-102b and/or one or more controllable devices 112a-112d has been moved by determining that otherwise stationary objects have changed locations (e.g., by analyzing two or more images captured by the detection device and/or taking the difference between those two or more images) and/or through receipt of a signal from a motion sensor (not shown). In one or more implementations, motion sensor is disposed on or within either of detection devices 102a-102b for determining when/if one or more of detection devices 102a-102b has moved. In some implementations, motion sensor is a discrete device that is separate and apart from the various devices illustrated in FIGS. 1 and 2.

After execution of the first portion 401 of method 400, in a second portion 411, method 400 includes operation of controllable devices at steps 412 and 414. In one or more exemplary implementations, gesture operation of controllable devices includes user commanded operation of the one or more controllable devices. It will be further appreciated that the first portion 401 of method 400 may, in some cases, be carried out without user interaction and/or when a user is out of the detectable area (e.g., detectable areas 104a-104b), while the second portion of method 400 can be carried out while a user is performing a predetermined gesture within the detectable area.

Auto-Configuration—

Referring again to FIG. 4, at step 402, the gesture recognition system 100 first scans a network for wireless controllable devices in order to determine their respective identifiers. In implementations, the wirelessly controllable devices are identified via a unique identifier (e.g., IP address, media access control (MAC) address, unique device identifier (UDID), serial number, etc.). Each wirelessly controllable device can have a unique identifier. For example, one or more of the devices 112a-112d may be associated with a unique MAC address. In some examples, discovery of wirelessly controllable devices can be carried out via standard transmission control protocol/internet protocol (TCP/IP) discovery processes through, for example, simple network management protocol (SNMP) network discovery processes. Additionally or alternatively, discovery of wirelessly controllable devices can be carried out via port scanning (e.g., Transmission Control Protocol (TCP) scanning, SYN scanning, User Datagram Protocol (UDP) scanning, etc.) and/or BLUETOOTH® discovery protocols. In exemplary implementations, the gesture recognition system 100 generates a device list specifying one or more devices, e.g., devices 112a-112d, that are available for configuration and/or operation. Additionally, although primarily envisioned as a wireless discovery process, it is appreciated that known wired discovery protocols may be readily substituted in implementations.

After scanning for controllable devices, at step 404, the gesture recognition system 100 operates the detection device in its visual discovery mode. In implementations, the detection device continuously sends (e.g., blasts) a number of signals (e.g., ON/OFF signals in accordance with known IR coding protocols) in order to cause the controllable devices to respond in a manner that can be detected visually and/or audibly (e.g., turning on a television). Step 404 can allow the gesture recognition system 100 to determine which controllable devices are in a detectable area and the location of those devices. In some implementations, the gesture recognition system 100 may operate each of the controllable devices consecutively (e.g., serially). For example, the system may first operate device 112a, then operate device 112b, next operate device 112c, and finally operate device 112d. In another example, the system may operate the controllable devices 112a-112d concurrently (e.g., in parallel) using a distinct operative pattern for each of controllable devices 112a-112d. For example, the gesture recognition system 100 may operate two or more detection devices substantially simultaneously such that, for example, device 112a is operating according to a first ON/OFF pattern via a first detection device 102a, while device 112d is concurrently operating according to a second ON/OFF pattern via a second detection device 102b. It will be appreciated that in other examples the gesture recognition system 100 can execute a combination of both consecutive and concurrent operation of the controllable devices. For example, at a first time instance, device 112a is operating according to a first ON/OFF pattern via a first detection device 102a, while device 112d is concurrently operating according to a second ON/OFF pattern via a second detection device 102b. Subsequently at a second time instance, device 112b is operating according to a first ON/OFF pattern via first detection device 102a, while device 112c is concurrently operating according to a second ON/OFF pattern via a second detection device 102b.

In response to the blast of signals at step 404, at step 406, the gesture recognition system 100 detects visual changes that occur. The visual changes can be identified by taking a difference between two or more frames of images taken by a detection device (e.g., detection device 102a-102b). This difference can be computed by subtracting the frames of images (e.g., subtracting the first frame from the second frame) and/or by comparing the frames of images. For example, the camera of the detection device 102a can store a first frame of an image in memory (e.g., memory of computing device 106) while device 112a is off. Then, device 112a can receive an ON/OFF signal for operation from the detection device 102a. The camera of detection device 102a can then record a second frame of an image in memory that captures a change in light intensity proximal to the location of controllable device 112a in response to this ON/OFF signal. Based at least in part on the difference between the first frame of the image, where the light appears off, and the second frame of the image, where the light appears on, the detection device 102a can recognize that the lamp has turned from OFF to ON. The gesture recognition system 100 then records the location of controllable device 112a in memory (e.g., memory of computing device 106) and/or on detection device 102a.

As another non-limiting example, detection device 102a can store a first frame of an image in memory (e.g., memory of computing device 106). In some cases, this first frame of image can capture the display of a channel number on device 112c, which can be a television. For example, display 112c may typically display a channel number, or the channel may be on display because a user recently changed the channel prior to the timing of taking of the first frame. Then, device 112c can receive a change channel signal for operation from detection device 102a. The camera of detection device 102a can then record a second frame of an image in memory that captures the channel change (e.g., where the new, changed channel number is displayed on device 112c) proximal to the location of controllable device 112c in response to this change channel signal. Based at least in part on the difference between the first frame of the image, where the channel number is a first number, and the second frame of the image, where the channel number is a second number, detection device 102a can recognize that the channel has changed, determine the location of controllable device 112c, and record the location of controllable device 112a in memory (e.g., memory of computing device 106). In some implementations, detection device 102a can be configured to recognize shapes of numbers and identify the numbers displayed on device 112c. Detection device 102a can then recognize the channel number captured in the first frame and the second frame, and determine if the channel has been turned in response to the change channel signal. In some cases, where the channel number has skipped to a non-consecutive number, detection device can recognize changes that have occurred due to other commands (e.g., page up/page down, or the entering of a channel number). The gesture recognition system 100 then recognizes the changes in response to the commands and records the location of controllable device 112c in memory of computing device 106 and/or of detection device 102c.

In some implementations, the gesture recognition system 100 can include other or additional detection devices, such as a microphone, to enable the gesture recognition system 100 to detect an audible measurable change in response to the blast of signals at step 404. For example, device 112b may be a stereo which receives an ON/OFF signal for operation from detection device 102. The microphone then captures a change in sound intensity proximal to the location of device 112b via the processing of audio signals captured by the microphone. In some cases, a signal processor communicatively coupled to the microphone can include sound recognition, which can allow the signal processor to detect and/or identify predetermined sounds/noises. Advantageously, multiple detection devices can be utilized alternatively or in combination (e.g., contemporaneously). By way of illustrative example, visual imaging and/or audio detection can be used. In some implementations, where visual imaging and audio detection are used in combination, detection devices can have increased robustness for identifying the location of devices 112a-112d even in noisy (e.g., visually and/or audibly noisy) environments because there are multiple mediums (e.g., visual and audio) in which these detection devices can detect changes in devices 112a-112d. Having both vision and audio can also advantageously decrease false positives by looking for e.g., devices 112a-112d that respond to two different mediums (e.g., audio and visual) instead of one. In some cases, instead of multiple detection devices, a single detection device 102 can detect a plurality of indicia such as both audio and visual. For example, video cameras can include microphones so that the video cameras can sense and/or record both audio and visual. An additional advantage is that locating devices 112a-112d through both audio and visual changes can enhance the ability of detection device 102 to detect those devices accurately by allowing verification of the locations of those devices. For example, once detection device 102 identifies the location of one of devices 112a-112d by either visual or audio, that location can then be verified and/or better approximated by the other of visual or audio.

In some implementations, a controllable device is located outside of the detectable area (e.g., the device may be in another room), and therefore automatic operation of the device may generate no measurable change in the environment. In this example, the system may ignore a device ID determined at step 402 and optionally later report to a user that the device was not visually detected. The gesture recognition system 100 detects the visual change using virtually any suitable technique. For example, the gesture recognition system 100 detects the measurable change by detecting a sudden change (e.g., within a prescribed time window) of a given sensory characteristic (e.g., a change in color, brightness, local contrast, sound level, etc.). As yet another example, the gesture recognition system 100 detects the measurable change by comparing a current sensory characteristic with a reference sensory characteristic. In the context of image processing, the reference sensory characteristic may be configured based on a reference frame depicting an initial state of the environment (e.g., a state where all controllable devices are off).

Figure 5:
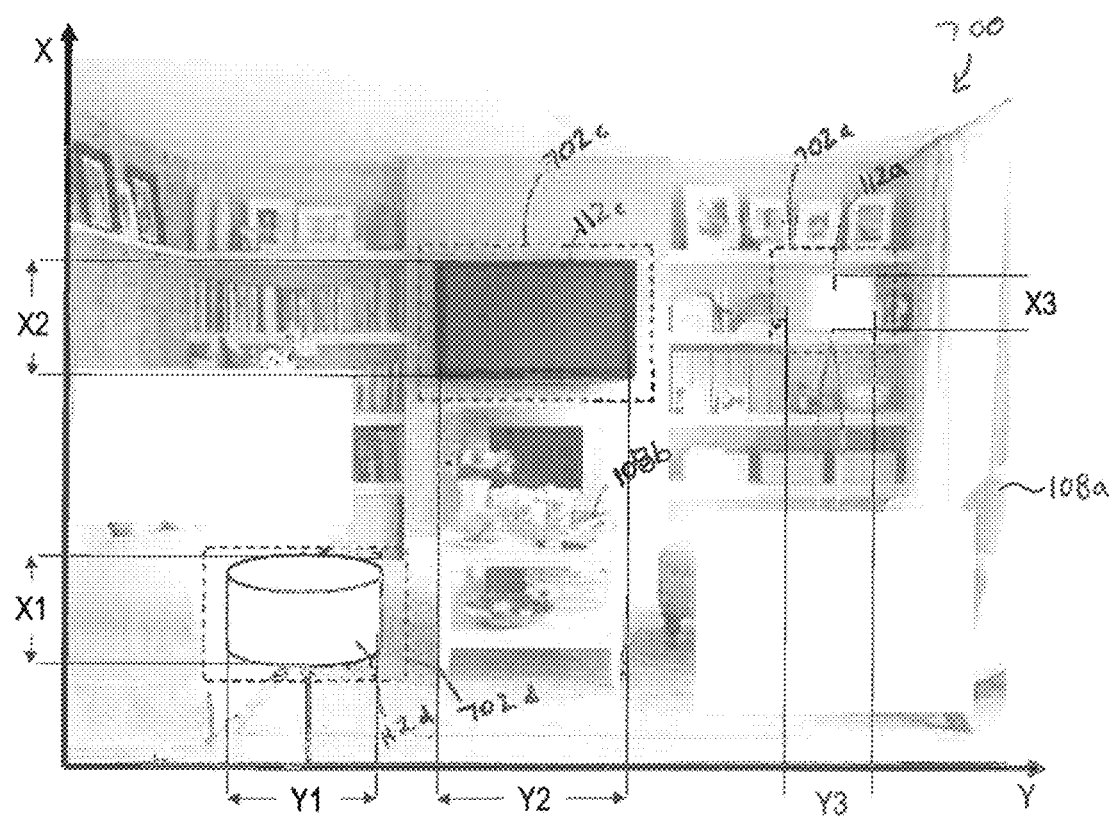
FIG. 5 is a perspective view that includes an example coordinate map and two-dimensional (2D) boundary areas in accordance with some implementations of the present disclosure.

Subsequent to detecting visual changes in a scene at step 406, the gesture recognition system 100 defines regions of interest (ROI) at step 408. For example, the gesture recognition system 100 records in memory the location of the measurable change and associates the location with a specific controllable device ID to create a local coordinate map of the detectable area. In implementations where one or more of the detection devices capture information in two dimensions (e.g., 2D-enabled), the local coordinate map generated will consist of a 2D map. The exact form of this local coordinate map can be formatted into any suitable format (e.g., a planar Cartesian coordinate map, a polar coordinate map, etc.). An example of a local 2D coordinate map for the detectable area of a gesture recognition system 100 is depicted in FIG. 5. As shown in FIG. 5, the local 2D coordinate map corresponds to the X-Y coordinates of images captured by the detection device. Based on the measurable change as detected in the images, the system associates the X1, Y1 region of the coordinate map with controllable device 112d. Similarly, the system associates the X2, Y2 region of the coordinate map with controllable device 112c, and associates the X3, Y3 region of the coordinate map with controllable device 112a.

Figure 6:
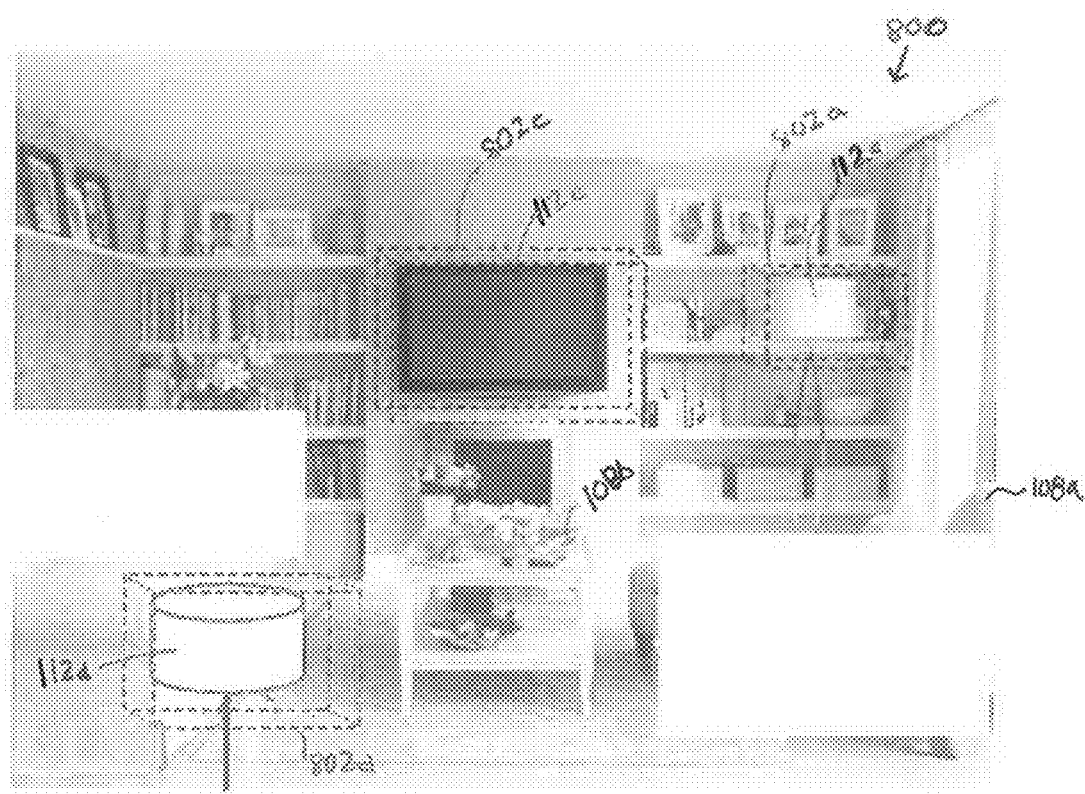
FIG. 6 is a perspective view that includes an example coordinate map and three-dimensional (3D) boundary areas in accordance with another implementation of the present disclosure.

In other implementations where one or more of the detection devices capture information in three dimensions (e.g., 3D-enabled) (e.g., stereoscopic cameras, etc.), the local coordinate map consists of a 3D map (e.g., a 3D Cartesian coordinate map, a cylindrical coordinate map, a spherical coordinate map, etc.). For example, the 3D map may correspond to the X-Y coordinates of images captured by the detection device and a Z coordinate indicating, for example, a distance of the controllable device from the detection device. An example of a local 3D coordinate map for the detectable area of a gesture recognition system 100 is depicted in FIG. 6.

In some implementations, multiple detection devices can be used to capture a 3D map. A first detection device can take a first video at a first angle. This first video can be 2D having Xa-Ya dimensions (which can be mapped with Xa-Ya coordinates). At substantially the same time, the second detection device can take a second video at a second angle. This second video can be 2D having Xb-Yb dimensions (which can be mapped with Xb-Yb coordinates). A computing device can receive the first video and second video. In some cases, the computing device can create a 3D map based at least in part on Xa-Ya dimensions from the first video and a Za dimension calculated at least in part on the Xb-Yb dimensions of the second video.

In some implementations, the first detection device can be substantially orthogonal to the second detection device and/or lie in substantially the same horizontal plane. In such cases, the field of view (and consequently ROIs) of the first detection device and second detection device can have substantial overlap (e.g., 30% or more overlap). In those cases, the 3D map can be generated in some implementations by taking the Xa-Ya dimensions of the first video and basing the Za dimension of the 3D map at least in part on the Xb (or Yb) dimension of the second video. However, in some cases, the first detection device, the second detection device, and/or any other detection device may not be substantially orthogonal and/or not and/or lie in substantially the same horizontal plane to each other. In some cases, the first detection device and second device may even only have a small area of overlap between their fields of view. In these cases, the computing device can construct the three-dimensional map using three-dimensional reconstruction from line projections in regions of overlap based at least in part on the videos taken from the detection devices.

Based at least on the local coordinate map and the detected measurable change, the system can assign a boundary area to each of the discovered controllable devices at step 410. For example, the boundary area may be an area with a location and dimensions that are comparable to the location and dimensions of the controllable device. For example, if the controllable device is a lamp, the assigned boundary area may consist of an area with roughly the same size/shape as the light shade of the lamp. The boundary area may additionally include a region adjacent to the device, such as the dimensions of the device plus an additional zone that is a pre-defined distance (e.g., 1 inch, 2 inches, or fractions thereof, etc.) beyond the dimensions of the controllable device. In examples where one or more of the detection devices are 2D-enabled and a 2D map is generated, the boundary areas will be 2D as well. Alternatively, in examples where one or more of the detection devices are 3D-enabled, the boundary areas will be 3D (or alternatively 2D). In both examples, the boundary areas may be overlaid on a detection device view for the detectable area.

Additionally, in certain implementations, the gesture recognition system 100 will assign two or more ROIs for a given/single controllable device. For example, in instances in which the detection device detects two separate visual changes to a scene (e.g., step 406), the recognition system can assign two different spatially distinct boundary areas for a given controllable device. Such a scenario could take place in a room where, for example, there is a mirror which causes two representations of a given controllable device (e.g., the actual controllable device and the controllable devices reflection within the mirror). In such an instance, the gesture recognition system 100 will, in an exemplary implementation, assign boundary areas to both areas of interest.

An example of a 2D boundary overlay 700 from the view point of a detection device is illustrated in FIG. 5. In this example, controllable devices 112a, 112c, and 112d are in the detectable area of a detection device. After discovering and mapping the device locations (e.g., steps 402-408 of method 400), the gesture recognition system 100 assigns a boundary area 702a to device 112a, a boundary area 702c to device 112c, and a boundary area 702d to device 112d. Each of the boundary areas enclose the device and include an additional zone a pre-defined distance beyond the outline of the controllable devices. In the illustrated example, the boundary areas are shown as squares; however, in other examples the boundary areas can trace the shape of the devices and/or be of other shapes (e.g., circular, triangular, etc.). Moreover, while the boundary areas are shown as being symmetrically placed about devices 112a-112c, it is recognized that in alternative implementations, these boundary areas may be placed asymmetrically about these devices. Each of these boundary areas will be associated with an identifier for each of the respective controllable devices.

An example of a 3D boundary overlay 800 from the view point of a detection device is illustrated in FIG. 6. In this example, controllable devices 112a, 112c, and 112d are in the detectable area of a detection device. After discovering and mapping the device locations (steps 402-408 of method 400), the gesture recognition system 100 assigns a boundary area 802a to device 112a, a boundary area 802c to device 112c, and a boundary area 802d to device 112d. Each of the boundary areas enclose the device and include an additional zone that is a pre-defined distance beyond the shape of the device (whether symmetrically or asymmetrically). In the present example, the boundary areas are shown as cubes, however, in other examples the boundary areas can trace the shape of the devices and/or be of other shapes (e.g., spherical, pyramidal, etc.). Each of these boundary areas can be associated with an identifier for each of the respective controllable devices (e.g., devices 112a-112d).

User Commanded Operation—

Returning again to FIG. 4, after execution of the auto-configuration mode 401 of method 400, in a second portion 411, method 400 includes operation of controllable devices at steps 412 and 414. In other words, the gesture recognition system 100 is configured to receive commands from a user for gesture operation of these discovered controllable devices (e.g., those discovered devices and assigned ROI's defined during auto-configuration 401).

As mentioned, audio or other sensory inputs can be used in the alternative or in combination with gestures. For example, audio can be detected by a detection device such as a microphone. As with gestures, gesture recognition system 100 can associate predetermined audio with operations. As an example, a user may make a predetermined noise, such as, without limitation: saying a word, making a sound/noise, using a device that speaks words or makes sounds/noises, hitting/tapping an object, or any other way of making a noise. This predetermined noise can be associated at least in part with any of the operations and/or controllable actions described in this disclosure, such as turning a channel, turning on/off a device, etc. By illustrative example, the predetermined noise itself can activate the operation initiated by gesture recognition system 100. As another example, the noise at a particular location, as determined at least in part by a visual system of gesture recognition system 100 and/or triangulation of the noise by the gesture recognition system 100, can activate the operation initiated by gesture recognition system 100. As another example, the noise in combination with a gesture can activate the operation initiated by gesture recognition system 100. Advantageously, where both noise and visuals are used to initiate an operation, false positives can be reduced. By way of illustration, in some of the examples that will be described below, a gesture recognition system 100 may associate a user reaching towards a device as a gesture to turn on/off that device. However, a user may on occasion reach towards a device without actually intending to turn on/off that device. For example, a drink may be sitting next to a lamp. Gesture recognition system 100 may associate reaching towards the lamp as a gesture that commands gesture recognition system 100 to turn on/off the lamp. However, a user might actually be reaching for a drink sitting next to a lamp instead of reaching towards the lamp. If gesture recognition system 100 associates both a noise (e.g., the user saying "lamp" or making some other noise) and a gesture (e.g., reaching towards the lamp or some other gesture) with an operation, merely reaching towards the lamp would not have produced the false positive of the lamp turning on/off. Similarly, having both audio and visual gestures, whatever they may be, used to command operations can reduce false positives.

At step 412, the system detects a predetermined gesture and/or an audible noise performed by a user within a boundary area to command operation of a controllable device. In one or more implementations, the gesture recognition system 100 is configured to disregard and/or ignore user movements (e.g., gestures) that are made outside of the boundary areas assigned at step 410 and/or gestures that do not match a predetermined gesture. In this way, such gestures performed in such boundary areas can sometimes be called region-specific gestures.

In some implementations, however, a gesture recognition system 100 can detect movements/gestures and/or audible noises, and perform operations without direct regard to the boundary areas assigned at step 410, or no boundary areas assigned in step 410.

For example, the gesture recognition system 100 may detect gestures in proximity, moving towards, and/or interacting with one or more controllable devices 112a-112d. By way of illustration, the gesture recognition system 100, through systems and methods described in this disclosure, may detect a user moving towards or gesturing towards (e.g., reaching his/her arm towards) devices 112a-112d. For example, a user may be across a room and interact by gesturing (e.g., pointing) to one of devices 112a-112d, which gesture recognition system 100 can recognize as a command to turn on/off that one of devices 112a-112d and/or perform any other operation associated at least in part with the gesture. A user may be in close proximity to one of devices 112a-112d (e.g., just outside the boundary area assigned at step 410 or within a predefined distance (e.g., approximately 1, 2, or 3 feet, or any predetermined absolute (e.g., in US, or standard units) or relative distance (e.g., pixels, lengths, etc.)) without regard to any boundary area) and interact by gesturing (e.g., pointing) at that device, which gesture recognition system 100 can recognize as a command to turn on/off that one of devices 112a-112d and/or perform any other operation associated at least in part with the gesture. A user may walk a distance (e.g., approximately 1, 2, or 3 feet, or any predetermined absolute (e.g., in US, or standard units) or relative distance (e.g., pixels, lengths, etc.) towards one of devices 112a-112d while looking at that device, which gesture recognition system 100 can recognize as a command to turn on/off that one of devices 112a-112d and/or perform any other operation associated at least in part with the gesture. As another example, gesture recognition system 100 can detect sounds in the alternative or in combination with any of the aforementioned example gestures. For example, a user can say "lamp" or make some other predefined noise (e.g., sound, words, etc.) while gesturing (e.g., pointing) at device 112a, which gesture recognition system 100 can recognize as a command to turn on/off device 112a and/or perform any other operation associated at least in part with the gesture and/or noise. As another example, a user can just say "lamp on" or make some other predefined noise (e.g., sounds, words, etc.), which gesture recognition system 100 can recognize as a command to turn on/off device 112a and/or perform any other operation associated at least in part with the noise. As another example, a user may touch or otherwise directly interact with one of devices 112a-112d, which gesture recognition system 100 can recognize as a command to turn on/off that one of devices 112a-112d and/or perform any other operation associated at least in part with the gesture. As another example, a user may make a predetermined noise while positioned in a predetermined location (e.g., as identified visually through a detection device). Gesture recognition system 100 can recognize the combination of the noise and location as a command to turn on/off one or more of devices 112a-112d and/or perform any other operation associated at least in part with the noise and location. Any of the aforementioned examples can also be performed by any person, animal (e.g., pet or other animal), or object (e.g., vehicle or toy).

In some implementations, gestures (e.g., region-specific gesture or gestures without direct regard to any boundary area) may be a pre-defined and/or predetermined movement the gesture recognition system 100 is programmed to recognize. For example, the movement can include motion (e.g., driving, walking, turning, etc.) by a person, animal (e.g., pet or other animal), object (e.g., vehicle or toy), etc. As another example, one such predefined gesture may include tapping/touching a portion of a lamp (e.g., the bottom portion, top portion, left portion, right portion, or any portion as desired), or tapping/touching the lampshade in order to turn on/off the lamp. A portion the lamp can include, but is not limited to a half, third, quarter, tenth, or other fraction of the lamp body. In some implementations, a user may have to tap/touch within a given ROI a predefined number of times (e.g., two) so as to avoid, for example, false positives. In some implementations, the user may touch the ROI once, wait for the device to briefly respond (e.g., a lamp may briefly blink on/off) and then touch the ROI once again to confirm the operation. In some implementations, a user may place his/her hand in the predefined ROI and hold it in place (e.g., for 1, 2, 3, 4, or any predefined number of seconds) until the device responds. Such implementations can reduce false positives resultant from transient movements (e.g., brief accidental touching or accidental crossing of the imaginary line between the detection device and the lamp). In some implementations, a given controllable device can be assigned multiple ROI. For example, in the context of the exemplary lamp, touching/tapping the top portion of the lamp may result in the lamp being turned ON, while touching/tapping the bottom portion of the lamp may result in the lamp being turned OFF. In some implementations, a user may make a visible "O" using that user's thumb and pointing finger when touching/approaching a light that the user wishes to turn ON.

In addition to these generally static gestures, the gesture recognition system 100 may instead rely on dynamic gestures in order to control a given controllable device. For example, a user wishing to control the volume on his/her television may swipe upwards within the assigned boundary area in order to raise the volume, or swipe downwards in order to lower the volume. Similarly, swiping upwards/downwards may operate the dimmer functionality of a light (e.g., swiping upwards brightens the light, while swiping downwards dims the light, etc.). Moreover, a user may choose to swipe either right-to-left/left-to-right in order to, for example, change the channel or change the color used for a given light source. Additionally, certain controllable devices can be operated by passing, for example, a user's hand along a controllable devices outline. For example, the gesture recognition system 100 can recognize when a user passes his/her hand along a predefined percentage (e.g., 50%) of the device's outline in order to prevent, inter alia, false positive, accidental gesture detections, etc. In some implementations, a user has the ability to customize the operation of the gesture recognition system 100 by selecting how to control operation (e.g., define gestures) for their controllable devices.

In addition to those specific examples given above (e.g., static and dynamic gestures), a user may also optionally be given the option to determine which predetermined gestures and/or audio that the user wishes to use. For example, a user could choose to touch/tap a ROI and then subsequently give a confirmatory gesture (e.g., a thumbs up, show two fingers, etc.) in order to confirm the user's selection of the touch/tap gesture for operating the respective controllable device. A user can also train the gesture recognition system 100 to associate particular gestures with particular commands by repeatedly demonstrating the gesture and performing the command for the controllable device in view of the detection device. In these ways, a user can associate a demonstrated gesture as the predetermined gesture in order to change a user-controlled operational state of one or more controllable devices using the systems and methods of this disclosure. A similar approach can be done using audio or other sensory inputs, or detection combination of gestures and audio and/or sensory inputs, where a user can train gesture recognition system 100 to associate commands to controllable devices based at least in part on those gestures, audio, and/or other sensory inputs. The method of this demonstrative association is described in U.S. Publication No. 2016/0075015 to Izhikevich et al., which is incorporated herein by reference in its entirety.

Additionally, a user has the ability to set up other rules such as timing rules for auto-configuration mode 401 and operation mode 411. For example, a user may elect to have the auto-configuration mode operated on a nightly basis or may elect to only control operation of certain controllable devices within a specified time period. Advantageously, the gesture recognition system 100 implementations described herein is simpler, faster and much more intuitive than prior art methods.

In some implementations, the gesture recognition system 100 detects the gestures (e.g., predetermined gestures) by detecting a sudden change within a predefined time window (e.g., a window of 1 seconds, 5 seconds, 10 seconds, etc.). In some implementations, the gesture recognition system 100 detects the gestures by comparing a current sensory input characteristic and a reference sensory input characteristic. In implementations that utilize image processing, the reference sensory input characteristic may be configured based on a reference frame depicting an initial state of the environment (e.g., a state where no user is present in the frame). In implementations that utilize a video camera detection device, the gesture recognition system 100 detects the gestures by performing, for example, a pixel-wise discrepancy analysis between images in a sequence in order to perform gesture recognition. The gesture recognition system 100 can also optionally use other suitable motion detection techniques to detect the gestures including, for example, background subtraction, optical flow analysis, image segmentation, and so forth.

Figure 7:
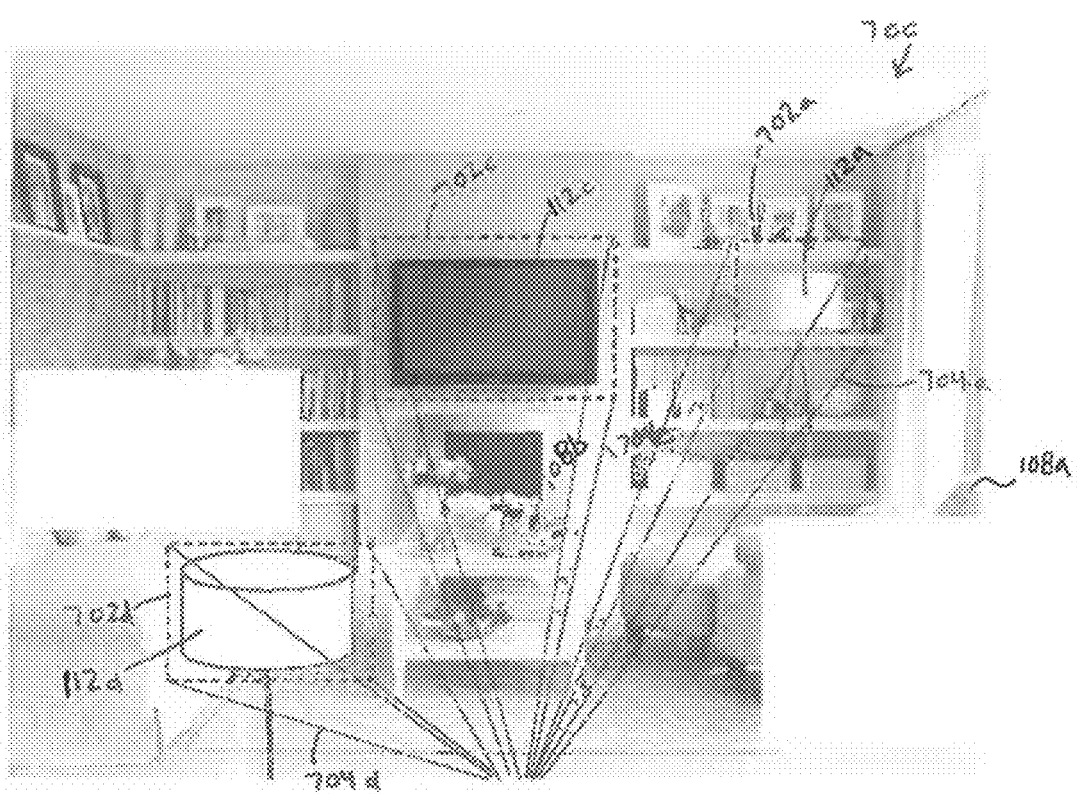
FIG. 7 is a perspective view that includes example 2D boundary areas and pathways between the boundary areas and a detection device in accordance with some implementations of the present disclosure.

In some implementations, the gesture recognition system 100 detects gestures performed in a pathway between the detection device and the controllable device. As shown in FIG. 7, a pathway 704a extends between the detection device and controllable device 112a, a pathway 704c extends between the detection device and controllable device 112c, and a pathway 704d extends between the detection device and controllable device 112d. Although not specifically shown, the detection device is located at a convergence point of pathways 704a, 704c, and 704d.

In the 3D boundary area overlay depicted in FIG. 6, a predetermined gesture may be made by a user within the 3D boundary area of the device in order to operate the controllable device. Accordingly, the gesture recognition system 100 detects a predetermined gesture performed at or near the location of the device within the boundary area of the device. In some implementations, the gesture recognition system 100 may detect a gesture performed in a pathway between the detection device and the 3D boundary area. In other implementations, the gesture recognition system may not detect a gesture performed outside of the 3D boundary area. For example, the gesture recognition system 100 may not detect the gesture performed in the pathway between the detection device and the 3D boundary area (which is outside of the 3D boundary area).

Returning again to FIG. 4, at step 414, the gesture recognition system 100 operates the specified controllable device in response to the detected gesture (e.g., step 412). The gesture recognition system 100 operates the device by sending a signal to the controllable device associated with the region within which the gesture was detected. The system may transmit the signal to the device via a wired interface and/or wireless (e.g., using radio frequency (RF), infrared (IR), pressure (sound), light, and/or other wireless carrier transmissions).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

In some implementations, a computing system that has components including a central processing unit (CPU), input/output (I/O) components, storage, and memory can be used to execute the detector system, or specific components and/or subcomponents of the system. The executable code modules of the monitoring system can be stored in the memory of the computing system and/or on other types of non-transitory computer-readable storage media. In some implementations, the detector system can be configured differently than described above.

Each of the processes, methods, and algorithms described in the preceding sections can be embodied in, and fully or partially automated by, code modules executed by one or more computers, computer processors, or machines configured to execute computer instructions. The code modules can be stored on any type of non-transitory computer-readable medium or tangible computer storage device, such as hard drives, solid state memory, optical disc, and/or the like. The systems and modules can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). The processes and algorithms can be implemented partially or wholly in application-specific circuitry. The results of the disclosed processes and process steps can be stored, persistently or otherwise, in any type of non-transitory.

The various features and processes described above can be used independently of one another, or can be combined in various ways. All possible combinations and sub-combinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described tasks or events can be performed in an order other than that specifically disclosed, or multiple can be combined in a single block or state. The example tasks or events can be performed in serial, in parallel, or in some other manner. Tasks or events can be added to or removed from the disclosed example implementations. The example systems and components described herein can be configured differently than described. For example, elements can be added to, removed from, or rearranged compared to the disclosed example implementations.

Unless otherwise defined, all terms (including technical and scientific terms) may be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. As applicable, terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A non-transitory computer-readable storage medium having computer-readable instructions stored thereon, that when executed by a processor configure the processor to:
   operate in an auto-configuration mode, in the auto-configuration mode the processor being configured to execute the computer-readable instructions to,
      discover a location of at least one of a plurality of controllable devices within a detecting area based on a signal transmitted by a respective one of the plurality of controllable devices, the signal comprising audio and visual changes pertaining to the respective one of the plurality of controllable devices within the detecting area to avoid false positives; and
   operate in an operation mode, the operation mode being different from the auto-configuration mode, and in the operation mode the processor being configured to execute the computer-readable instructions to,
      detect an audio noise from a user and a body gesture from the user in order to command an operation of the at least one of the plurality of controllable devices in the detecting area,
      assign a boundary area to each of the plurality of the controllable devices by associating a first boundary area with a first unique identifier and a different second boundary area with a different second unique identifier, the first and second unique identifiers being associated to a first and second controllable devices, respectively, and
      operate at least one of the plurality of controllable devices in response to the detection of the at least one of the audio noise and the body gesture from the user.

2. The non-transitory computer-readable storage medium of claim 1, wherein
   the detection of the at least one of the audio noise or the body gesture further comprises detection of the at least one of the audio noise or the body gesture within the assigned boundary area.

3. The non-transitory computer-readable storage medium of claim 1, further comprising:
   determining the unique identifiers of each of the plurality of the controllable devices further comprises wireless detection within a wireless network of the first unique identifier and the second unique identifier.

4. The non-transitory computer-readable storage medium of Claim 1, wherein
   the at least one of the audio noise or the body gesture is directed towards a respective one of the plurality of the controllable devices.

5. The non-transitory computer-readable storage medium of claim 1, wherein,
   the user includes a motion performed by at least one of a person, animal, or object.

6. The non-transitory computer-readable storage medium of claim 1, wherein,
   the signal is detected within the detecting area by at least one of a camera sensor or a microphone.

7. The non-transitory computer-readable storage medium of claim 1, wherein the processor is further configured to execute the computer-readable instructions to,
   learn an association between the at least one of the noise and the body gesture from the user and the operation of the one or more of the plurality of the controllable devices while in the operational mode such that, upon detecting the at least one of the audio noise and the body gesture from the user within the detecting area the at least one of the plurality of controllable devices performs the operation.

8. A method for operating a gesture detection system, the method comprising:
   operating in an auto-configurable mode, in the auto-configuration mode a processor being configured to execute computer-readable instructions to:
      discover a location of at least one of a plurality of controllable devices within a detecting area based on a signal transmitted by a respective one of the plurality of controllable devices, the signal comprising audio and visual changes pertaining to the respective one of the plurality of controllable devices within the detecting area to avoid false positives; and
   operating in an operation mode, the operation mode being different from the auto-configuration mode, and in the operation mode the processor being configured to execute the computer-readable instructions to,
      detect an audio noise from a user and a body gesture from the user in order to command an operation of the at least one of the plurality of controllable devices within the detecting area, assign a boundary area to each of the plurality of the controllable devices by associating a first boundary area with a first unique identifier and a different second boundary area with a different second unique identifier, the first and second unique identifiers being associated to a first and second controllable devices, respectively, and operate at least one of the plurality of controllable devices in response to the detection of the at least one of the audio noise and the body gesture from the user.

9. The method of claim 8, further comprising:

learning an association between the at least one of the noise and the body gesture from the user and the operation of the one or more of the plurality of the controllable devices while in the operational mode such that, upon detecting the at least one of the audio noise and the body gesture from the user within the detecting area, the at least one of the plurality of the controllable devices performs the operation.

10. The method of claim 8, further comprising:

assigning a boundary area to at least one of the plurality of the controllable device, wherein the detecting of the at least one of the audio noise or the body gesture comprises detecting the at least one of the audio noise or the body gesture being performed within the boundary area.

11. A system for detecting gestures for operation of a plurality of controllable devices within a detecting area, the system comprising:

at least one detection device;

a processing apparatus in communication with the at least one detection device; and a non-transitory computer readable storage medium having a plurality of instructions stored thereon, that when executed by the processing apparatus, cause the processing apparatus to, operate in an auto-configuration mode, in the auto-configuration mode the processing apparatus being configured to execute the instructions to, discover a location of the plurality of controllable devices within the detecting area based on a signal transmitted by a respective one of the plurality of controllable devices, the signal comprising audio and visual changes pertaining to the respective one of the plurality of controllable devices within the detecting area to avoid false positives; and operate in an operation mode, the operation mode being different from the auto-configuration mode, and in the operation mode the processing apparatus being configured to execute the instructions to, detect an audio noise from a user and a body gesture from the user in order to command operation of the at least one of the plurality of controllable devices in the detecting area, assign a boundary area to each of the plurality of the controllable devices by associating a first boundary area with a first unique identifier and a different second boundary area with a different second unique identifier, the first and second unique identifiers being associated to a first and second controllable devices, respectively, and operate at least one of the plurality of controllable devices in response to the detection of the at least one of the audio noise and the body gesture from the user.

12. The system of claim 11, wherein the processing apparatus is further configured to execute the computer-readable instructions to the act of detecting the at least one of the audio noise or the body gesture form the user comprises detecting the at least one of the audio noise and the body gesture within the boundary area.

13. The system of claim 12, wherein the processing apparatus is further configured to execute the computer-readable instructions to learn an association between the at least one of the audio noise from the user or the body gesture from the user and the operation of the at least one of the plurality of controllable devices while in the operational mode such that, upon detecting the at least one of the audio noise and the body gesture from the user within the detecting area, the at least one of the plurality of controllable devices performs the operation.

* * * * *